Oct. 2, 1956          C. R. GROSH ET AL          2,765,365
SOUND DISTRIBUTION SYSTEM FOR AUTOMOBILES
USING DRIVE-IN THEATERS
Filed Feb. 18, 1953
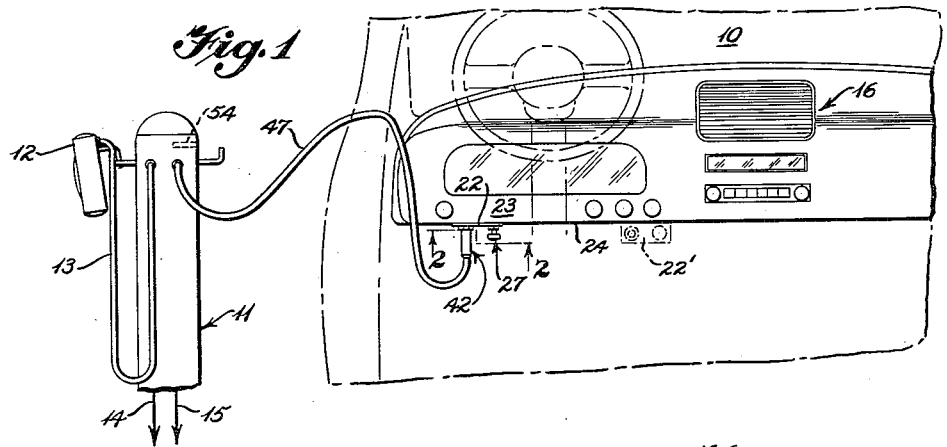
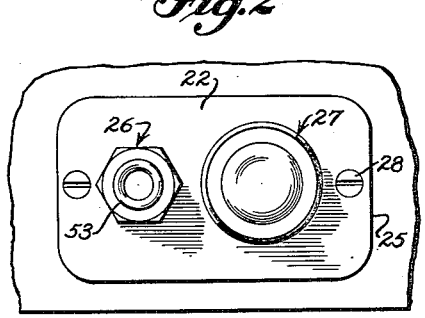
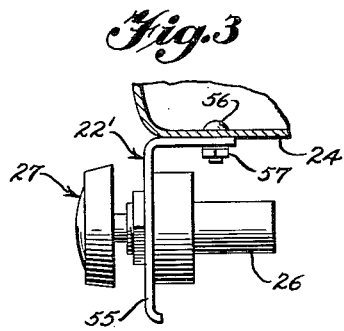
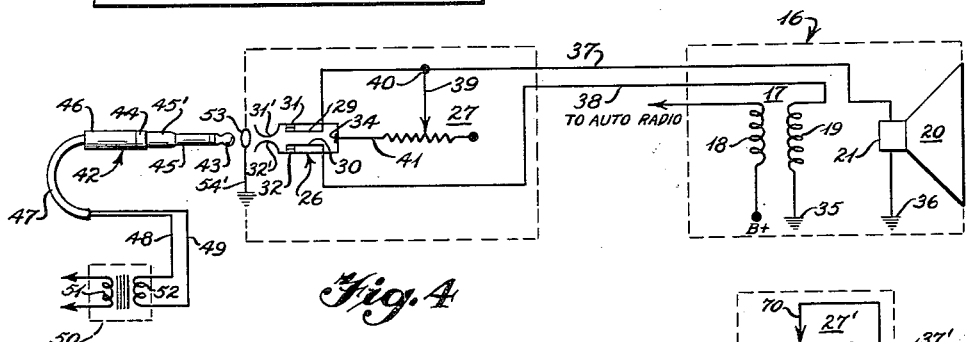
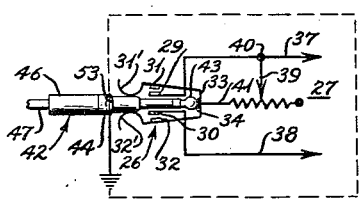
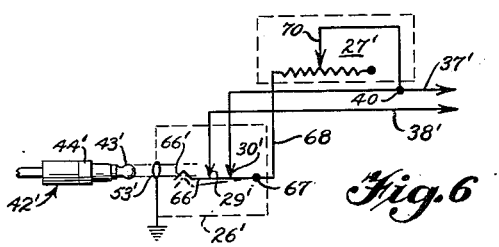
INVENTORS
*Charles R. Grosh* and
*John R. Betters*
By *Beale and Jones*
ATTORNEYS

United States Patent Office 2,765,365
Patented Oct. 2, 1956

2,765,365

SOUND DISTRIBUTION SYSTEM FOR AUTOMOBILES USING DRIVE-IN THEATERS

Charles R. Grosh, Gasport, N. Y., and John R. Betters, McKeesport, Pa.; said Betters assignor to said Grosh Application February 18, 1953, Serial No. 337,556

3 Claims. (Cl. 179—1)

Our invention relates to sound distributing systems, and more particularly to a system whereby an automobile having a radio and using a "drive-in" theater is provided with an adapter system so that the voice coil of its radio is connected to the theater sound system thereby eliminating the need for the usual loud speakers.

A sound distribution system of the "drive-in" theater type with which our invention may be used is illustrated in U. S. Patent 2,469,986, issued May 10, 1949. In this patent there is disclosed a "drive-in" theater having stallways into which automobiles are driven so that the passengers may view the moving pictures projected onto the outdoor screen. Adjacent the stallways there is provided posts which house a transformer having its primary connected with the sound system of the "drive-in" theater. The secondary winding of the transformer is connected to a small loud speaker by means of a flexible electrical cable. Thus, the small loud speakers may be positioned within the automobile and the passengers in the automobile may watch the moving picture on the screen and hear the sound through the small loud speaker.

There is an initial cost of installation of these small loud speakers and in addition the upkeep and maintenance of these small loud speakers is costly. These small loud speakers are exposed to rain and inclement weather and deteriorate thus necessitating continual repair and eventual replacement. The loud speakers being small and compact do not provide for good reproduction of sound.

An object of our invention is to provide a system wherein these small loud speakers may be eliminated and use may be made of the usual automobile radio loud speaker to reproduce the sound normally reproduced by these small loud speakers.

The usual automobile radio has a much larger loud speaker than is provided at "drive-in" theaters for the individual automobile patrons and thus by using the automobile loud speaker much better sound reproduction is obtained.

Another object of our invention is to provide an inexpensive attachment for an automobile by which the usual voice coil of an automobile radio may be disconnected from the automobile radio output transformer and connected to an electrical plug which is in turn connected by a flexible cable to the secondary winding of the usual sound transformer adjacent a stallway in a "drive-in" theater.

A still further object of the invention is to provide in the attachment just described above a volume control by which the "drive-in" theater sound may be varied in the automobile radio loud speaker.

Another object of our invention is to provide an attachment as above described for the automobile using a "drive-in" theater which is operable by insertion of the plug as described above to cut out the connection between the automobile radio output transformer and the automobile loud speaker voice coil and connect the secondary of the "drive-in" theater sound transformer adjacent a stallway with the voice coil of the automobile radio loud speaker.

Still further objects and the entire scope of applicability of the present invention will become apparent from the detailed description given hereinafter; it should be understood, however, that the detailed description and specific examples are given by way of illustration only and, while indicating preferred embodiments of the invention, are not given by way of limitation, since various changes and modifications within the spirit and scope of the invention will become apparent to those skilled in the art from this detailed description.

For a more complete understanding of the nature and scope of our invention reference may be had to the drawing in which:

Fig. 1 is a partial view of the interior of an automobile having a radio and parked in a "drive-in" theater adjacent the usual post which normally carries the small loud speaker but with our system installed and connected with the sound output at the post;

Fig. 2 is a view along line 2—2 of Fig. 1 showing our adapter attached to the automobile in Fig. 1;

Fig. 3 is a modified form of adapter shown in broken lines in Fig. 1 attached to the lower edge of the automobile's instrument panel;

Fig. 4 is a circuit diagram of our system;

Fig. 5 is a partial circuit diagram of Fig. 4 showing the switch contacts with the connector plug inserted in the switch unit of the adapter; and Fig. 6 is a circuit diagram of another modified form that our invention may take.

Throughout the various figures and description like reference numerals refer to similar parts.

In Fig. 1 an automobile 10 is shown parked in a "drive-in" theater stallway adjacent a post 11 carrying the usual small loud speakers 12 that are connected by a flexible conductor 13 to the secondary of the sound transformer housed within the post 11. The primary of the sound transformer housed within the post is connected by wires 14 and 15 to the sound system of the "drive-in" theater.

The automobile 10 has mounted therein the usual automobile radio generally indicated at 16. Referring to Fig. 4 the automobile radio receiver 16 is shown provided with the output transformer 17 having a primary winding 18 and a secondary winding 19 and a loud speaker 20. The loud speaker 20 has a voice coil generally indicated at 21.

An adapter generally indicated at 22 according to our invention is easily and quickly attached to the instrument panel 23 of the automobile as along the lower edge 24 thereof by screws 28. Another form that the adapter may take is shown at 22' and it is mounted as shown in Fig. 3.

Adapter 22, as shown in Fig. 2, is made up of a mounting plate 25 on which is mounted a jack or switch unit 26 and a rheostat or volume control unit 27 both of which are shown connected in the system as shown in Fig. 4.

In Fig. 4 a fixed contact 29 cooperates with a movable contact 31 mounted on the leaf spring 31' while movable contact 32 on leaf spring 32' cooperates with fixed contact 30. A circuit is completed between the leaf springs 31' and 32' by the backing strip 33 of the switch unit 26 which has a contact button 34 affixed thereto to make contact with a plug to be described. In the usual radio receiver installed in an automobile, the secondary winding is led to a ground 35 and connected at its other end to the voice coil 21 which is also grounded as at 36 to the automobile frame. In our system we provide a circuit with adapter couplings so that the voice coil 21 may be used either with the automobile radio output transformer 17 or with the sound transformer of a "drive-in" theater.

In our system the voice coil is connected by a wire 37 to the fixed contact 29 of switch unit 26. The secondary coil 19 of the automobile radio transformer 17 is connected by wire 38 to the other fixed contact 30 of switch unit 26. Thus a circuit is completed from ground connection 35, through secondary winding 19 of the transformer 17, wire 38, switch unit contacts 30 and 32, leaf spring 32', the back of switch 33, leaf spring 31', contacts 29 and 31, wire 37 and through voice coil 21 to ground 36. This circuit is maintained when the automobile radio is to function and its loud speaker 20 is to be used therewith.

In the system according to our invention there is provided a volume control 27 which is connected as by wire 39 to the variable member thereof to wire 37 as at juncture 40. The other side of the rheostat 27 is connected by wire 41 to contact button 34 in the switch back 33 of switch unit 26. We provide a two conductor plug 42 which has an end terminal 43 and a ground terminal 44 with dielectric portion 45 disposed therebetween. The dielectric portion 45 has a cam surface 45' thereon which when the plug is inserted in the jack or switch unit 26 contacts and moves outward the leaf springs 31' and 32' and in turn breaks the contact between contacts 29 and 31 as actuated by leaf spring 31' and contacts 30 and 32 as actuated by leaf spring 32'. The plug has a hand portion 46 which is of dielectric material. Plug 42 is connected to one end of a flexible two conductor cable 47 having conductors 48 and 49 therein that are connected respectively to the ground 44 and the end contact 43 of the plug 42. The other ends of the conductors 48 and 49 are connected to the ends of the secondary winding 52 of the sound output transformer 50 housed within the post 11 as shown in Fig. 1. The primary winding 51 of transformer 50 is connected in the usual manner to the sound system output leads of the "drive-in" theater such as 14 and 15 as shown in the post in Fig. 1.

Still referring to Fig. 4, the switch unit 26 has a ground terminal 53 which is grounded at 54' to the frame of the automobile. Such a ground is shown in the jack or switch unit 26 as indicated in Fig. 2.

In Fig. 5 there is illustrated the position of the parts of switch unit 26 when the plug 42 is inserted therein. The end terminal 43 on the plug 42 is in contact with the contact button 34 and a circuit is completed therefrom through the wire 41 to and through rheostat 27 to wire 37 which is connected to the voice coil 21 of the automobile radio loud speaker. At the same time the dielectric cam surface 45' on the plug 42 has contacted leaf springs 31' and 32' and opened contacts 29 and 31 as well as 30 and 32 so that the circuit from the automobile radio output transformer secondary 19 to the voice coil 21 is broken. This circuit completion as shown in Fig. 5 taken with Fig. 4 in part places the loud speaker 20 in circuit with the "drive-in" theater sound system. The advantages of the larger loud speaker 20 as compared with the smaller loud speaker, such as 12 in Fig. 1, are enjoyed by the passengers in the automobile 10 viewing the motion picture.

When the cable 47 and its plug 42 is to be disconnected from the switch unit 26 on the automobile, it is merely necessary to pull out plug 42 and it may be housed in a dead end insulated socket 54 shown in broken lines in post 11 in Fig. 1.

In Fig. 3 the modified form of adapter 22' is mounted on a right angle bracket 55 which is easily attached to the bottom edge 24 of the instrument panel by a bolt and nut 56—57. The switch unit or jack 26 and the volume control unit or rheostat 27 are mounted in the vertical panel presented by the mounting bracket 55. Otherwise the switch unit 22' is the same in construction and operation as the switch unit 22.

Referring now to Fig. 6 there is shown a modified form of adapter system also according to our invention. The particular form of the switch unit 26' includes fixed contacts 29' and 30' and a cooperating movable contact 66 having an anchored contact point 67. Contact 67 is connected by wire 68 to one terminal of rheostat 27' while the other terminal 70 which is the variable connection on the rheostat is connected to wire 37' at 40. Wire 37' as in the circuit in Fig. 4 is connected to the voice coil 21 of the automobile loud speaker 20. Wire 37 is also connected to fixed contact 30' of switch unit 26'. The other fixed contact 29' of switch unit 26' is connected to wire 38' leading to the secondary winding 19 of the automobile radio output transformer 17 as in Fig. 4. The plug 42' in the modified form of system is similar to plug 42 as shown in Figures 4 and 5 and has a contact terminal 43' which makes contact with a cam portion 66' on movable contact finger 66 to complete a circuit therewith to the volume control unit 27' and the voice coil 21 as it breaks the circuit at contacts 29' and 30'. When the circuit is broken at contacts 29' and 30' the output of the automobile radio transformer 17 is cut off from the voice coil 21 of its loud speaker 20. Plug 42' has a ground contact 44' which completes a circuit to ground with ground contact 53' of the switch unit 26'. Otherwise the operation of the circuit shown in Fig. 6 of our adapter is the same as that shown and described for Fig. 4.

The adapter switch unit 26, volume control unit 27 and connector cable 47 and its plug 42 may all be very easily installed. Their installation can be borne by the "drive-in" theater operator and his costs of upkeep and repair are reduced. At the same time the partrons of the "drive-in" theater may enjoy listening to improved sound reproduction over their own car radio loud speakers which are larger than the customary small loud speaker provided at "drive-in" theaters and thus reproduce sound with greater fidelity.

We claim as our invention:

1. An electrical system for automobiles using outdoor theaters having a sound system output provided for each automobile and an electrical cable connected at one end to said sound system output and provided with an electrical conductor plug on the other end thereof, said electrical system comprising in combination, a switch unit, a volume control unit, and an automobile radio receiver having an output circuit, a loud speaker and a voice coil associated therewith, said switch and volume control units being adapted to be permanently attached to said automobile, said switch unit being adapted to receive said electrical conductor plug and having contacts electrically connected between the automobile radio output circuit and said voice coil to complete a circuit therebetween whereby movement of said switch contacts to a first position by removal of said plug from said switch unit, completes a circuit from said automobile radio to said voice coil, said volume control unit being electrically connected with said switch unit so that when said switch contacts are moved to said first position by removal of said plug, the volume control unit is made inoperative, and when the switch unit contacts are moved to their second position by insertion of said plug therein, said volume control unit is electrically connected to said voice coil of the automobile loud speaker and through said switch contacts, plug, and electrical connector to said sound system output.

2. An electrical system for automobiles using outdoor theaters having a sound system output transformer for each automobile and an electrical cable having two leads connected at one end thereof to said output transformer and at their other end to an electrical conductor plug and the contact and ground terminals thereof, said electrical system comprising in combination, a switch unit, a volume control unit having two terminals, and an automobile radio receiver having an output circuit, a loud speaker and a voice coil associated therewith, having one side thereof grounded to the automobile, said switch and volume control units being adapted to be permanently attached to said automobile, said switch unit having a ground connection, a first and a second contact and movable contact finger adapted in one position to complete a circuit across said contacts and in a second position to interrupt said circuit between said contacts, said electrical conductor plug being insertable in said switch unit and upon insertion having the ground terminal thereof contacting the ground connection on the switch and the contact thereon contacting an actuating said movable contact finger of the switch unit, said movable contact finger being connected to one of said terminals of the volume control unit, a conductor connecting the output circuit of said automobile radio and said first contact on the switch unit, a conductor connecting the second contact of the switch unit and said voice coil, a conductor connecting the other terminal of said volume control unit and said voice coil, said plug on insertion in said switch unit contacting its ground terminal with that of the switch unit and moving the movable contact to interrupt the circuit between the first and second contacts thereby disconnecting the radio output circuit from the voice coil of the loud speaker and connecting the output of said sound system with the movable contact, the volume control unit and said voice coil of the loud speaker.

3. An electrical system for automobiles using outdoor theaters having a sound system output transformer for each automobile and an electrical cable having two leads connected at one end thereof to said output transformer and at their other end to an electrical conductor plug and the contact and ground terminals thereof, said electrical system comprising in combination, a switch unit, a volume control unit and an automobile radio receiver having an output circuit, a loud speaker and a voice coil associated therewith having one side thereof grounded to the automobile, said switch and volume control units being adapted to be permanently attached to said automobile, said switch unit having a pair of fixed contacts, movable contacts cooperating therewith, an end terminal and a ground contact, a conductor connecting the output circuit of said radio receiver with one of said switch unit fixed contacts, a conductor connecting the other of said switch unit fixed contacts and said voice coil, said volume control unit having two terminals, one of which is connected to said conductor to the voice coil while the other is connected to said end contact on the switch unit, said plug on said lead from the output transformer of the sound system being adapted to be inserted into said switch unit whereupon the ground terminal thereon connects with the ground connection on the switch unit, said movable contacts are moved out of contact with their respective fixed contacts to interrupt the circuit from said radio receiver to the voice coil of the loud speaker and the contact terminal on the plug contacts the end terminal of the switch unit completing a circuit from the output transformer of said sound system through said volume contact unit to said voice coil of the loud speaker.

References Cited in the file of this patent
UNITED STATES PATENTS

| | | |
|---|---|---|
| 1,531,606 | Grebe | Mar. 31, 1925 |
| 2,619,544 | Satterfield | Nov. 25, 1952 |